US011151694B2

(12) United States Patent
Ferrés et al.

(10) Patent No.: US 11,151,694 B2
(45) Date of Patent: Oct. 19, 2021

(54) METHOD AND APPARATUS FOR CONVOLUTIONAL NEURAL NETWORK-BASED VIDEO DENOISING

(71) Applicant: GoPro, Inc., San Mateo, CA (US)

(72) Inventors: Matias Tassano Ferrés, Paris (FR); Thomas Nicolas Emmanuel Veit, Meudon (FR); Julie Delon, Paris (FR)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/412,722

(22) Filed: May 15, 2019

(65) Prior Publication Data
US 2020/0364834 A1    Nov. 19, 2020

(51) Int. Cl.
G06T 5/00     (2006.01)
G06T 7/20     (2017.01)
G06T 5/50     (2006.01)
G06T 5/20     (2006.01)
G06T 7/38     (2017.01)
H04N 5/235    (2006.01)

(52) U.S. Cl.
CPC ............... *G06T 5/002* (2013.01); *G06T 5/20* (2013.01); *G06T 5/50* (2013.01); *G06T 7/20* (2013.01); *G06T 7/38* (2017.01); *H04N 5/2357* (2013.01); *G06T 2207/10016* (2013.01); *G06T 2207/20081* (2013.01); *G06T 2207/20084* (2013.01)

(58) Field of Classification Search
CPC .. G06T 5/002; G06T 7/38; G06T 5/20; G06T 5/50; G06T 7/20; G06T 2207/20084; G06T 2207/10016; G06T 2207/20081; H04N 5/2357
See application file for complete search history.

(56) References Cited

U.S. PATENT DOCUMENTS 9,449,374 B2 *  9/2016  Nash ............... H04N 5/23232
2019/0304069 A1 * 10/2019  Vogels ............... G06T 15/06
2020/0357096 A1 * 11/2020  Gao .................... G06T 5/20

OTHER PUBLICATIONS

Alex Krizhevsky, Ilya Sutskever, and Geoffrey E Hinton, "ImageNet Classification with Deep Convolutional Neural Networks," NIPS, pp. 1-9, 2012.
Anna Khoreva, Anna Rohrbach, and Bernt Schiele, "Video object segmentation with language referring expressions," in ACCV, 2018.
Antoni Buades and Jose-Luis Lisani, "Patch-Based Video Denoising With Optical Flow Estimation," IEEE Trans. IP, vol. 25, No. 6, pp. 2573-2586, 2016.
(Continued)

*Primary Examiner* — Padma Haliyur
(74) *Attorney, Agent, or Firm* — Young Basile Hanlon & MacFarlane, P.C.

(57) ABSTRACT

A method and apparatus for denoising a video are disclosed. The method includes obtaining multiple frames of the video. One or more frames of the video may be temporally precedent or temporally subsequent to a central frame. The method includes performing a first denoising of the multiple frames. The method includes concatenating the denoised frames into a concatenated input. The method includes performing a second denoising of the concatenated input. The method includes outputting a denoised frame based on the denoised concatenated input.

20 Claims, 11 Drawing Sheets

(56) References Cited

OTHER PUBLICATIONS

D.P. Kingma and J.L. Ba, "ADAM: a Method for Stochastic Optimization," Proc. ICLR, pp. 1-15, 2015.

H.C. Burger, C.J. Schuler, and S. Harmeling, "Image denoising: Can plain neural networks compete with BM3D?," 2012, pp. 2392-2399.

K Dabov, A Foi, and V Katkovnik, "Image denoising by sparse 3D transformation-domain collaborative filtering," IEEE Trans. IP, vol. 16, No. 8, pp. 1-16, 2007.

K. He, X. Zhang, S. Ren, and J. Sun, "Deep Residual Learning for Image Recognition," in Proc. CVPR, 2016, pp. 770-778.

K. Ma, Z. Duanmu, Q. Wu, Z. Wang, H. Yong, H. Li, and L. Zhang, "Waterloo Exploration Database: New Challenges for Image Quality Assessment Models," IEEE Trans. IP, vol. 26, no. 2, pp. 1004-1016, 2017.

K. Zhang, W. Zuo, and L. Zhang, "FFDNet: Toward a Fast and Flexible Solution for CNN based Image Denoising," IEEE Trans. IP, vol. 27, No. 9, pp. 4608-4622, 2018.

K. Zhang, W. Zuo, Y. Chen, D. Meng, and L. Zhang, "Beyond a Gaussian denoiser: Residual learning of deep CNN for image denoising," IEEE Trans. IP, vol. 26, No. 7, pp. 3142-3155, 2017.

M. Gharbi, G. Chaurasia, S. Paris, and F. Durand, "Deep joint demosaicking and denoising," ACM Trans. Graphics, vol. 35, No. 6, pp. 1-12, 2016.

M. Lebrun, A. Buades, and J. M. Morel, "A Nonlocal Bayesian Image Denoising Algorithm," SIAM Journal IS, vol. 6, No. 3, pp. 1665-1688, 2013.

Matias Tassano, Julie Delon, and Thomas Veit, "An Analysis and Implementation of the FFDNet Image Denoising Method," IPOL, vol. 9, pp. 1-25, 2019.

Matteo Maggioni, Giacomo Boracchi, Alessandro Foi, and Karen Egiazarian, "Video denoising, deblocking, and enhancement through separable 4-D nonlocal spatiotemporal transforms," IEEE Trans. IP, vol. 21, No. 9, pp. 3952-3966, 2012.

Pablo Arias and Jean-Michel Morel, "Video denoising via empirical Bayesian estimation of space-time patches," Journal of Mathematical Imaging and Vision, vol. 60, No. 1, pp. 70-93, 2018.

Philippe Weinzaepfel, Jerome Revaud, Zaid Harchaoui, and Cordelia Schmid, "DeepFlow: Large displacement optical flow with deep matching," in IEEE ICCV, Sydney, Australia, Dec. 2013.

Razvan Pascanu, Tomas Mikolov, and Yoshua Bengio, "On the difficulty of training recurrent neural networks," in ICML, 2013, pp. 1310-1318.

Sergey Ioffe and Christian Szegedy, "Batch Normalization: Accelerating Deep Network Training by Reducing Internal Covariate Shift," in Proc. ICML. 2015, pp. 448-456, JMLR.org.

Thijs Vogels, Fabrice Rousselle, Brian McWilliams, Gerhard R-othlin, Alex Harvill, David Adler, Mark Meyer, and Jan Nov'ak, "Denoising with kernel prediction and asymmetric loss functions," ACM Trans. Graphics, vol. 37, No. 4, pp. 124, 2018.

U. Schmidt and S. Roth, "Shrinkage fields for effective image restoration," 2014, No. 8, pp. 2774-2781.

V. Santhanam, V.I. Morariu, and L.S. Davis, "Generalized Deep Image to Image Regression," in Proc. CVPR, 2016.

Wenzhe Shi, Jose Caballero, Ferenc Huszar, Johannes Totz, Andrew P. Aitken, Rob Bishop, Daniel Rueckert, and Zehan Wang, "Real-Time Single Image and Video Super-Resolution Using an Efficient Sub-Pixel Convolutional Neural Network," in Proc. CVPR, 2016, pp. 1874-1883.

Xinyuan Chen, Li Song, and Xiaokang Yang, "Deep rnns for video denoising," in Applications of Digital Image Processing XXXIX. International Society for Optics and Photonics, 2016, vol. 9971, p. 99711T.

Y. Chen and T. Pock, "Trainable Nonlinear Reaction Diffusion: A Flexible Framework for Fast and Effective Image Restoration," IEEE Trans. PAMI, vol. 39, No. 6, pp. 1256-1272, 2017.

* cited by examiner

METHOD AND APPARATUS FOR CONVOLUTIONAL NEURAL NETWORK-BASED VIDEO DENOISING

TECHNICAL FIELD

This disclosure relates to image and video denoising.

BACKGROUND

Compared to image denoising, video denoising appears as a largely underexplored domain. Typical image denoising methods based on deep learning techniques require many hand-tuned parameters in the training process, and a specific model must be trained for each noise level. These methods require large computing times and have a large memory footprint, and are therefore impractical for use in video denoising. It would therefore be desirable to have a video denoising method based on deep learning techniques that do not require large computing times and large memory requirements.

SUMMARY

Disclosed herein are implementations of convolutional neural network-based video denoising. An aspect may include a method for denoising a video. The video may include multiple frames. The method may include obtaining a first frame of the video. The method may include obtaining a second frame of the video. The second frame of the video may be a temporally precedent frame relative to the first frame. The method may include obtaining a third frame of the video. The third frame of the video may be a temporally subsequent frame relative to the first frame. The method may include performing a first denoising of the first frame, the second frame, and the third frame. The method may include aligning the denoised second frame with respect to the first frame. The method may include aligning the denoised third frame with respect to the first frame. The method may include concatenating the denoised first frame, the aligned denoised second frame, and the aligned denoised third frame into a concatenated input. The method may include performing a second denoising of the concatenated input. The method may include outputting a denoised frame based on the denoised concatenated input.

An aspect may include an image capture device. The image capture device may include an image sensor and one or more denoisers. The image capture device may include a motion estimator. The image sensor may be configured to capture a first frame, a second frame, and a third frame. The one or more denoisers may include a spatial denoiser. The spatial denoiser may be configured to denoise the first frame, the second frame, and the third frame. The first frame, the second frame, and the third frame may be denoised individually. The motion estimator may be configured to detect an object in each of the first frame, the second frame, and the third frame. The motion estimator may be configured to estimate a motion of the object. The motion estimator may be configured to apply a transformation to each of the first frame, the second frame, and the third frame. The transformation may be based on the estimated motion. The one or more denoisers may include a temporal denoiser. The temporal denoiser may be configured to denoise an output of the motion estimator and output a denoised frame.

An aspect may include an image capture device. The image capture device may include an image sensor and one or more denoisers. The one or more denoisers may include a spatial denoiser, a temporal denoiser, or both. The image sensor may be configured to capture a first frame and an adjacent frame. The spatial denoiser may be configured to denoise the first frame and the adjacent frame. The spatial denoiser may be trained using a cropped version of the first frame. The temporal denoiser may be configured to denoise an output of the spatial denoiser and output a denoised frame. The temporal denoiser may be trained using an output of the spatial denoiser training.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1A:
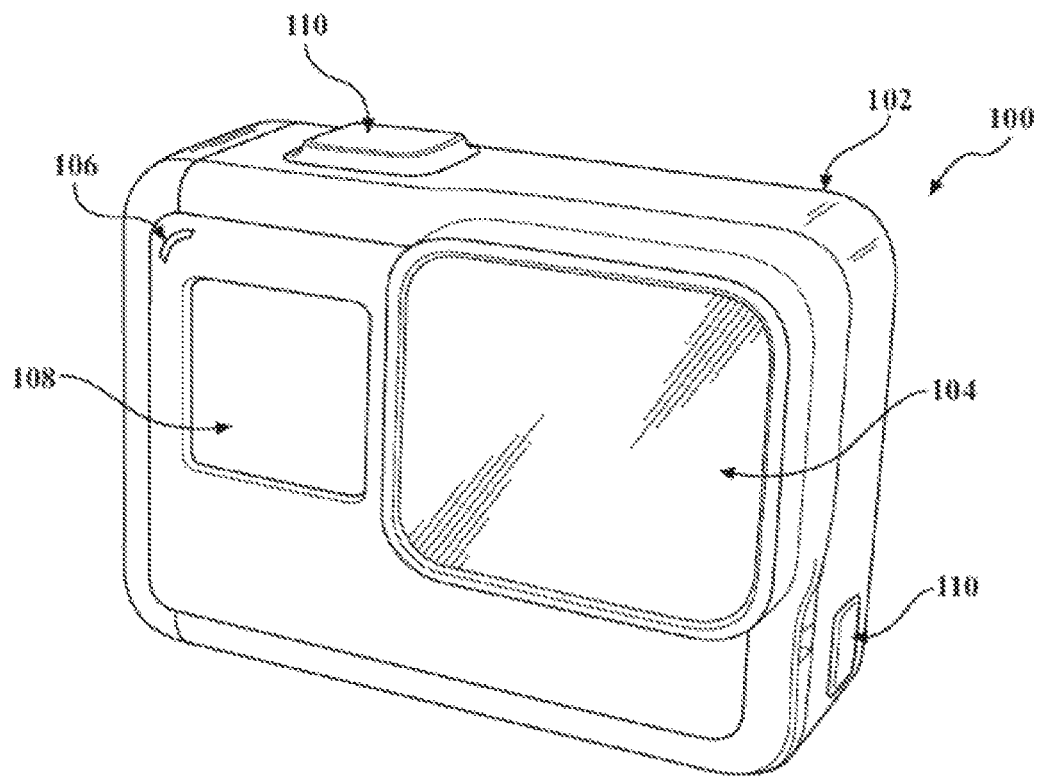
FIGS. 1A-D are isometric views of an example of an image capture device.

The implementations disclosed herein employ deep learning approaches to video denoising. There may be two factors in the disclosed video denoising approaches that enforce temporal coherence in the results, namely the extension of search regions from spatial neighborhoods to volumetric neighborhoods, and the use of motion estimation. For example, the former provides that when denoising a pixel or patch, the algorithm may detect similar pixels or patches, not only in the same frame, but also in adjacent frames of the sequence. In addition, the video denoising approaches disclosed herein may use motion estimation, motion compensation, or both to improve video denoising performance.

The implementations disclosed herein may use a two-stage denoising process. In the first stage, a frame and one or more neighboring frames may be individually denoised. These frames may be denoised, for example, using a spatial denoiser. Although each individual frame output at this stage may be of good image quality, the frames may exhibit flickering when viewed in sequence. In the second stage, the temporal neighbor frames may be registered or aligned with respect to the central frame. Optical flow may be used for this purpose. The aligned frames may be concatenated and input into a second denoiser. The second denoiser may be a temporal denoiser. Using temporal neighbors when denoising each frame may reduce flickering as the residual error in each frame will be correlated. In some implementations, a noise map may be added to the input of the spatial and temporal denoisers. The inclusion of the noise map may allow for the processing of spatially varying noise.

The examples described herein refer to the addition of additive white Gaussian noise (AWGN). It is understood that the implementations disclosed herein may be extended to other types of noise, for example, spatially varying noise (e.g., Poissonian noise). For the examples disclosed herein, let I be a noiseless image, while $\tilde{I}$ is its noisy version corrupted by a realization of zero-mean white Gaussian noise N of standard deviation σ, then $$\tilde{I}=I+N. \tag{1}$$

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touchscreen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and an LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
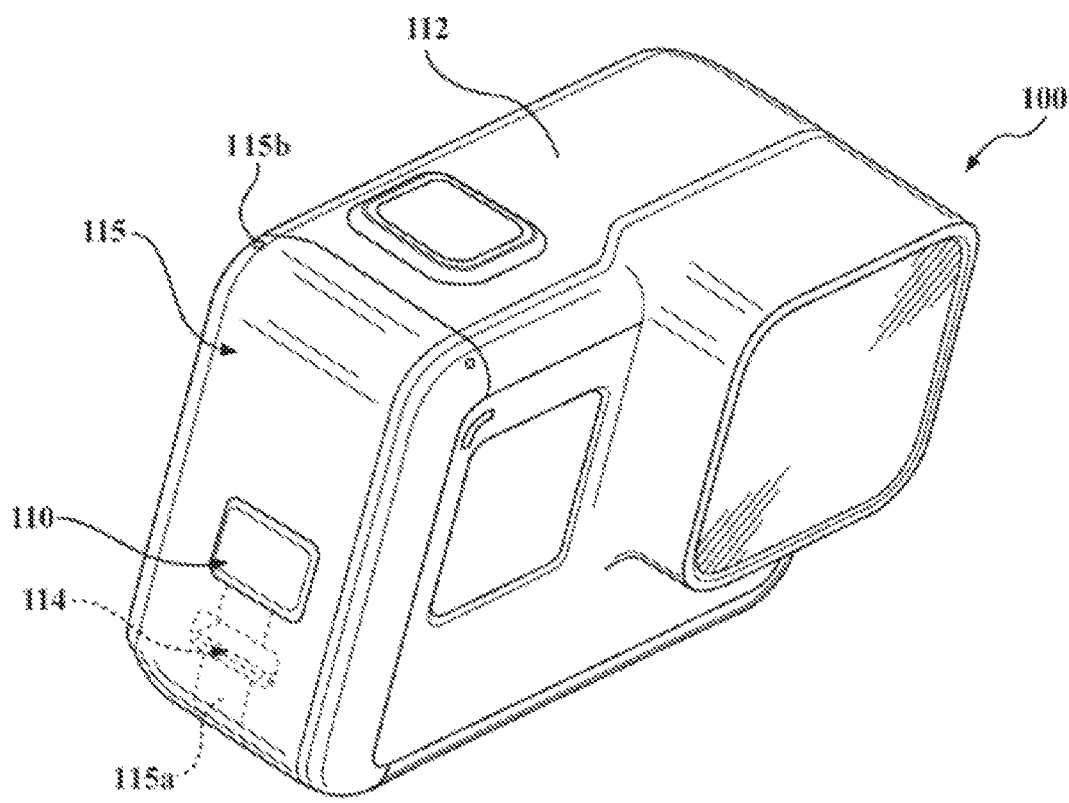
Figure 1C:
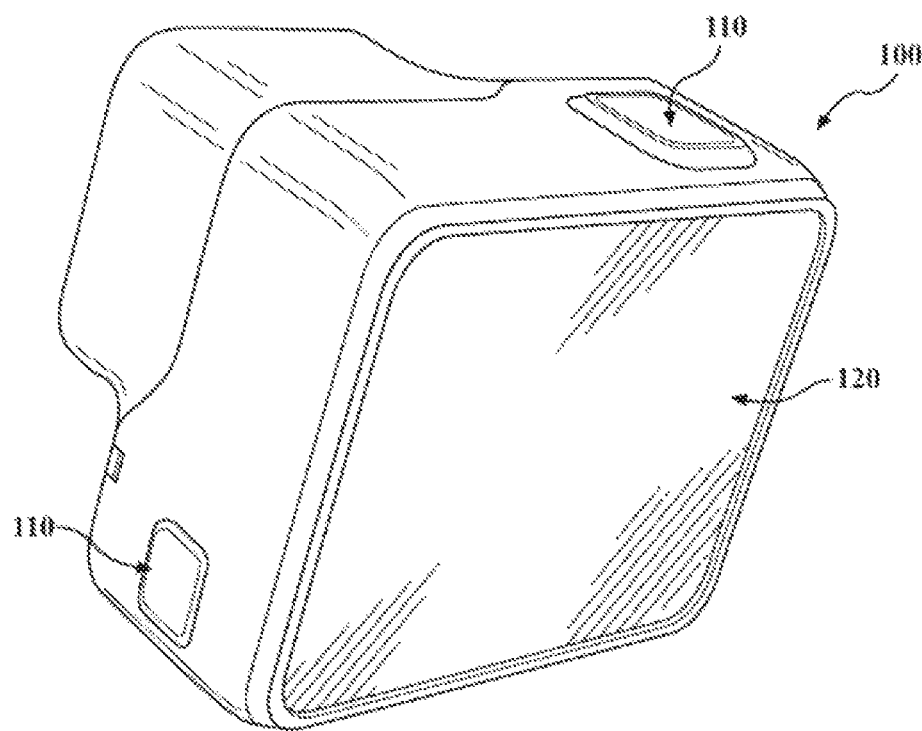
Figure 1D:
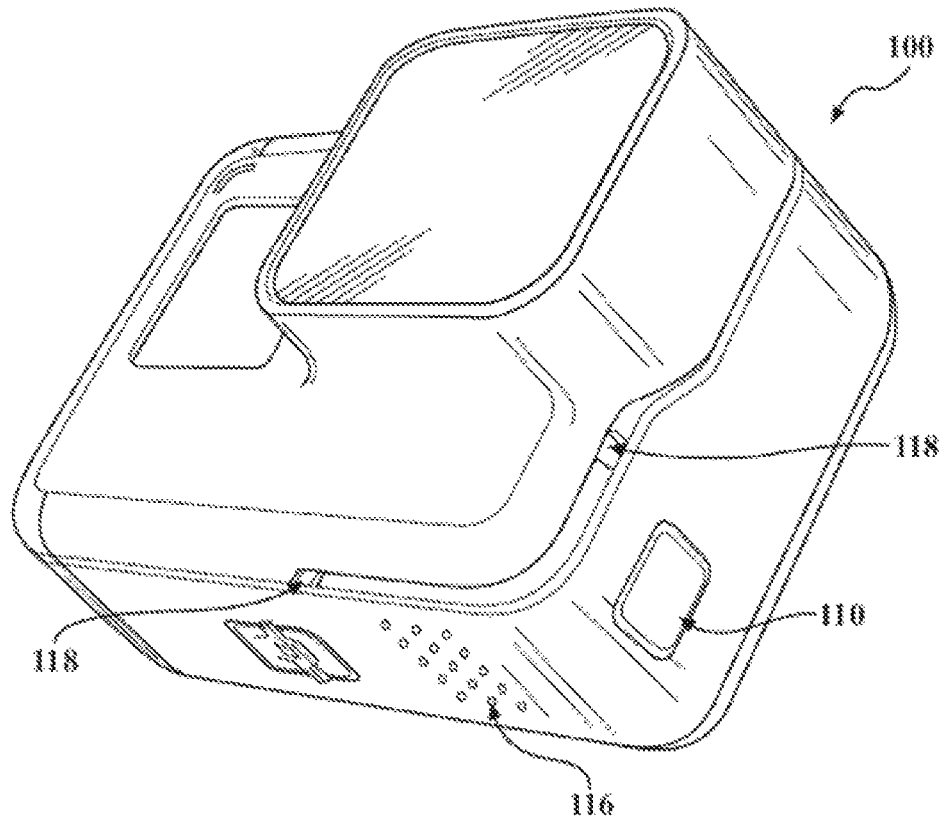

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115*a* (e.g., hidden as indicated using dotted lines) that is opened by engaging the associated button 110 as shown.

The removable door 115 can also be secured to the image capture device 100 using a hinge mechanism 115*b*, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115*a* and the hinge mechanism 115*b* allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described herein. For example, the image capture device 100 may include additional buttons or different interface features, such as interchangeable lenses, cold shoes and hot shoes that can add functional features to the image capture device 100, etc.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the Internet.

In some implementations, the computing communication link may be a Wi-Fi link, an infrared link, a Bluetooth (BT) link, a cellular link, a ZigBee link, a near-field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
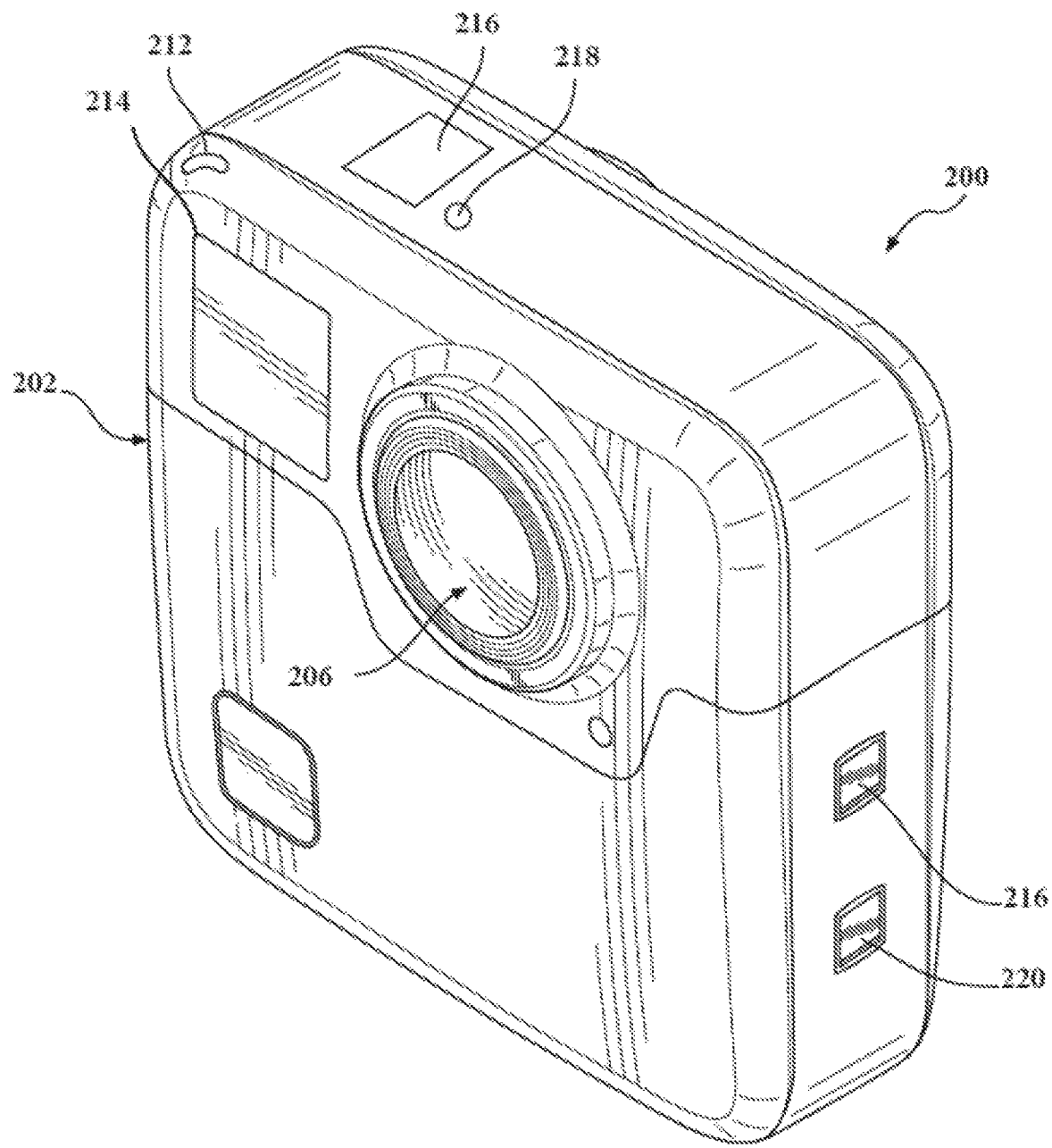
FIGS. 2A-B are isometric views of another example of an image capture device.
Figure 2B:
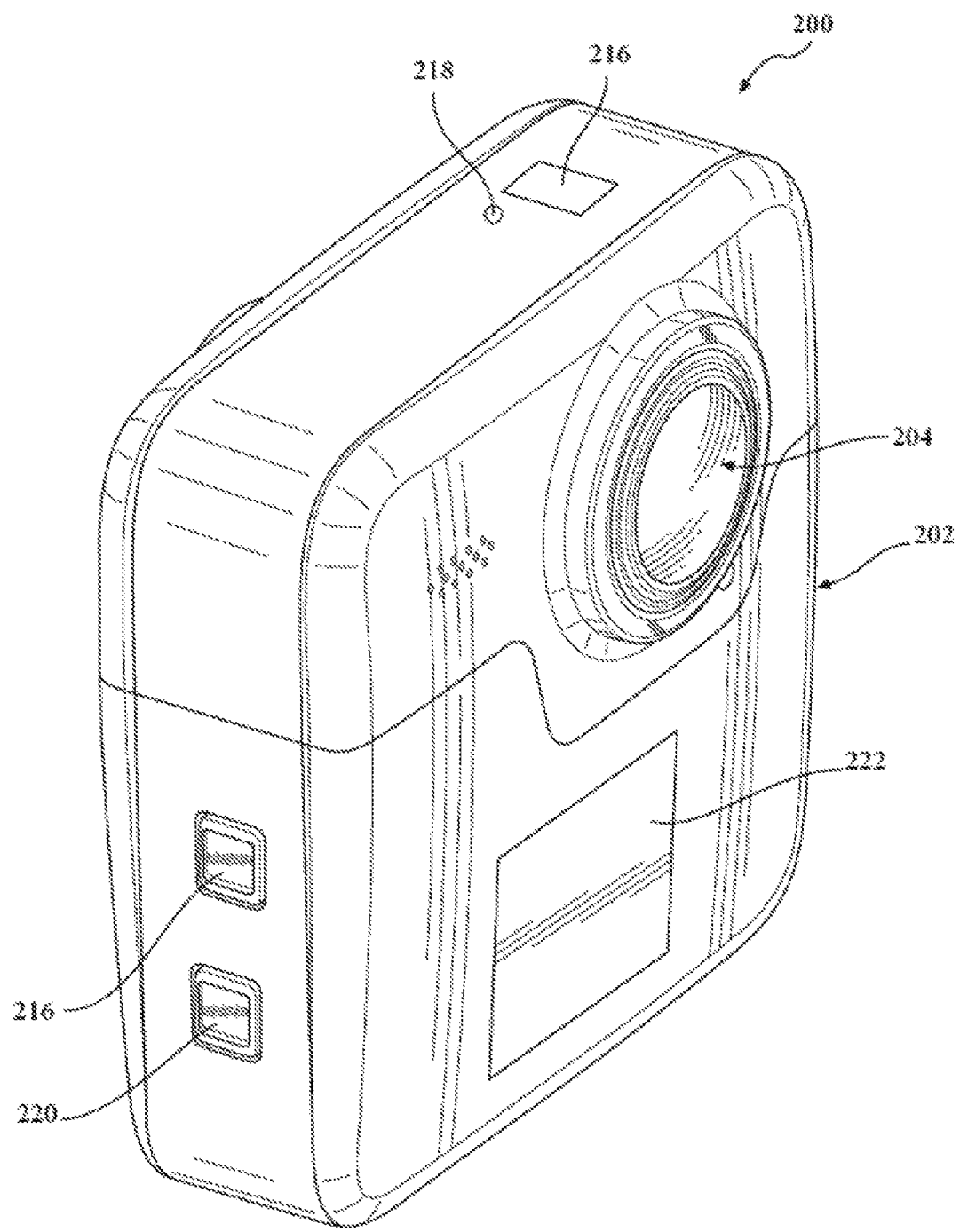

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device 200 may include electronics (e.g., imaging electronics, power electronics, etc.) internal to the body 202 for capturing images via the lenses 204, 206 and/or performing other functions. The image capture device may include various indicators, such as an LED light 212 and an LCD display 214.

The image capture device 200 may include various input mechanisms, such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
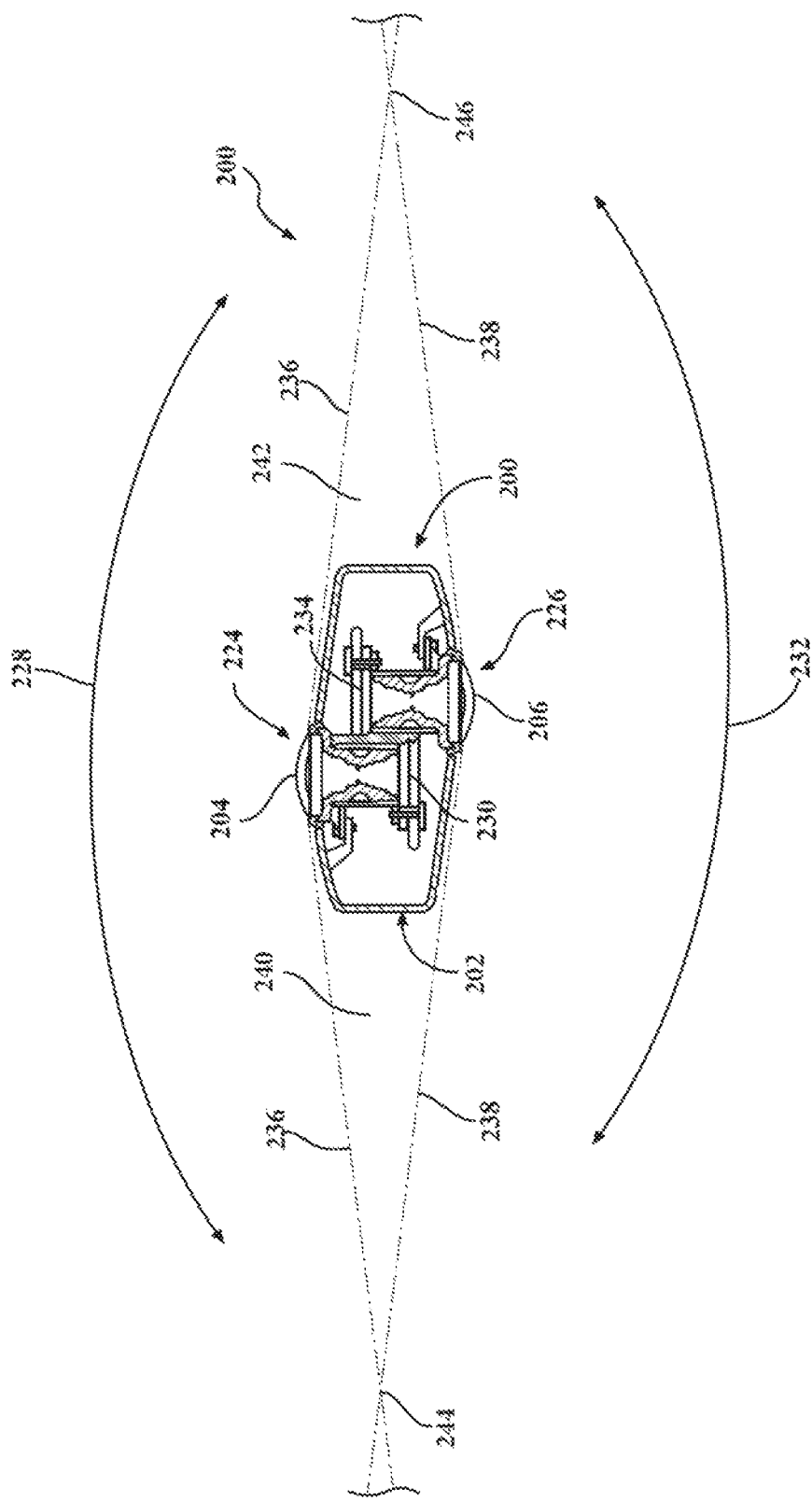
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and, accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
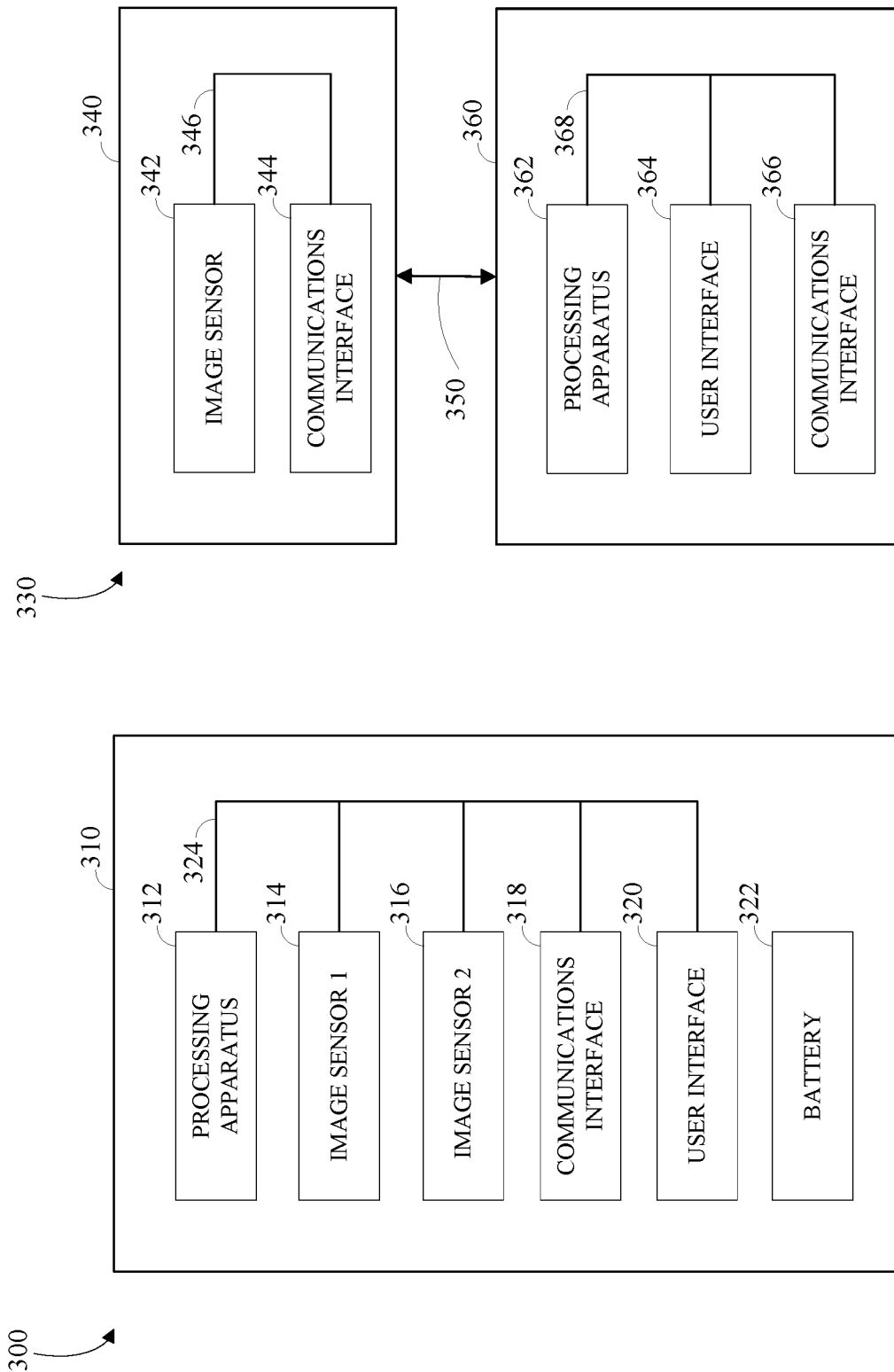
FIGS. 3A-B are block diagrams of examples of image capture systems.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory (RAM) device, flash memory, or another suitable type of storage device, such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields-of-view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 5:
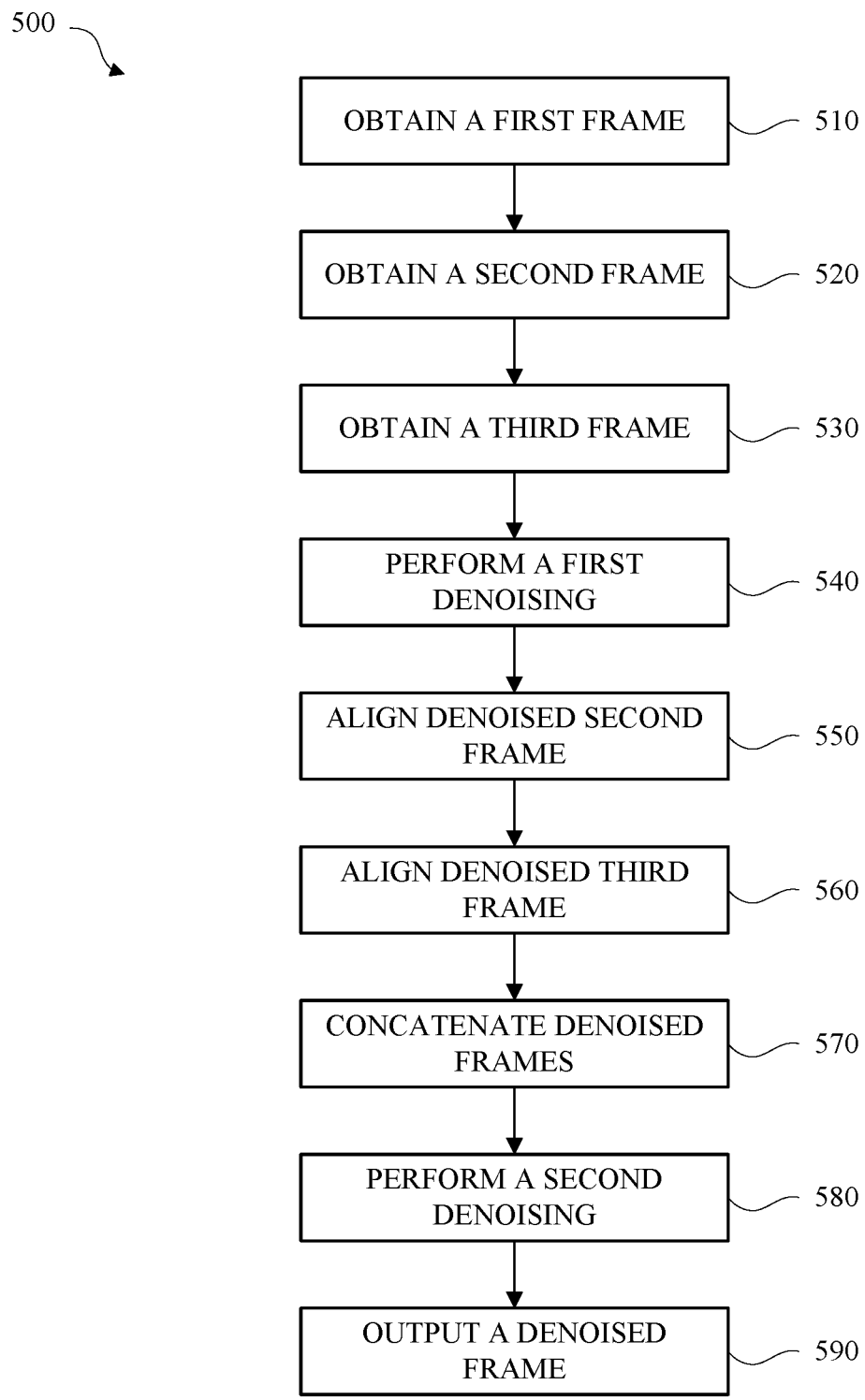
FIG. 5 is a flow diagram of an example of a video denoising method.

The image capture system 300 may be used to implement some or all of the methods described in this disclosure, such as the method 500 described with respect to FIG. 5.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device, such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the methods described in this disclosure, such as the method 500 of FIG. 5.

Figure 4:
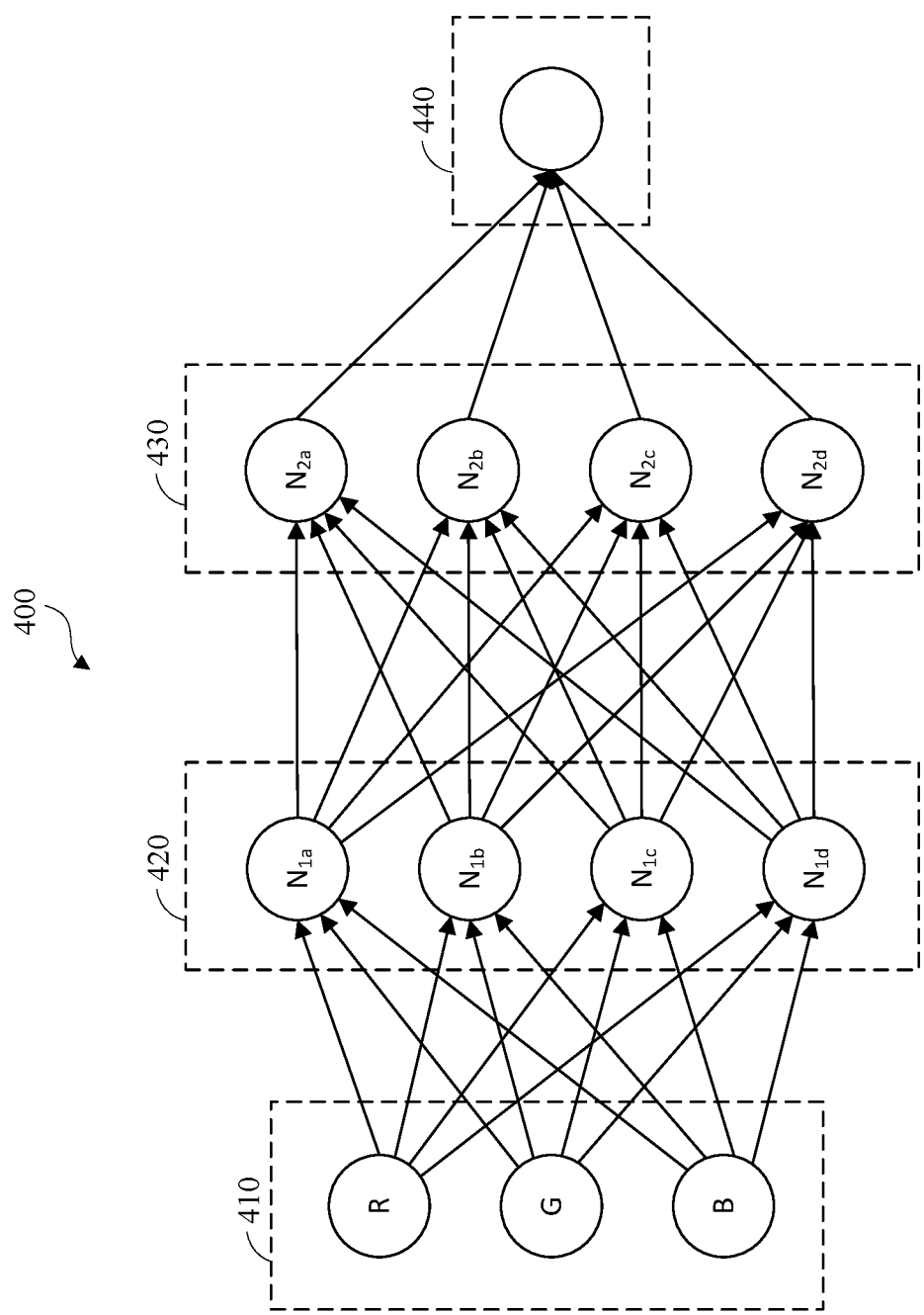
FIG. 4 is a block diagram of an example of a convolutional neural network.

FIG. 4 is a block diagram of an example of a convolutional neural network 400 in accordance with embodiments of this disclosure. As shown in FIG. 4, the convolutional neural network 400 includes an input layer 410, a first hidden layer 420, a second hidden layer 430, and an output layer 440. The example convolutional neural network 400 may include any number of hidden layers, and two hidden layers are shown merely as an example for simplicity and clarity.

The input layer 410 may hold the raw pixel values of an image arranged in three dimensions. The three dimensions may include a width, a height, and a depth. The depth may refer to an activation volume. The input images are an input volume of activations, and the volume has dimensions of width, height, and depth. For example, the input layer 410 may include raw pixel values associated with an image width in pixels, an image height in pixels, and with three color channels, red (R), green (G), and blue (B).

The first hidden layer 420 and the second hidden layer 430 each include a set of neurons, where each neuron is fully connected to all the neurons in the previous layer. For example, neuron $N_{2b}$ of the second hidden layer 430 is connected to neuron $N_{1a}$, neuron $N_{1b}$, neuron $N_{1c}$, and neuron $N_{1d}$ of the first hidden layer 420. The neurons of the first hidden layer 420 and the second hidden layer 430 are arranged in three dimensions having a width, a height, and a depth. The depth refers to the third dimension of an activation volume, and may refer to the total number of layers in a network. In some embodiments, the neurons in a layer may only be connected to a small region of the layer before it, rather than in a fully-connected manner.

The first hidden layer 420 and the second hidden layer 430 each perform transformations that are a function of the activations and of the parameters (i.e., the weights and biases of the neurons). The first hidden layer 420 receives an input at each neuron from each channel of the input layer 410. Each neuron of the first hidden layer 420 transforms the input from each channel. The second hidden layer 430 receives the transformed input at each neuron from each neuron from the first hidden layer 420. Each neuron of the second hidden layer 430 transforms the transformed input from each neuron of the first hidden layer 420. In some examples, the first hidden layer 420, the second hidden layer 430, or both, may include a convolutional layer, a rectified linear unit (ReLU) activation layer, a normalization layer, or any combination thereof in any order. The convolutional layer may be configured to compute the output of neurons that are connected to local regions in the input, each neuron computing a dot product between their weights and a small region to which they are connected in the input volume. The ReLU activation layer may apply an elementwise activation function, for example, the max(x, 0) thresholding at zero. The normalization layer may be used to normalize the input layer by adjusting and scaling the output of the previous activation layer.

The output layer 440 may be referred to as a fully-connected layer. The output layer 440 is configured to perform transformations that are a function of the activations and of the parameters (i.e., the weights and biases of the neurons). The output layer 440 may be configured to compute a score, for example, a classification score to categorize an image.

FIG. 5 is a flow diagram of an example of a video denoising method 500 in accordance with embodiments of this disclosure. The method 500 may be performed with any number of frames, and is shown with three frames as an example. Referring to FIG. 5, the method 500 includes obtaining 510 a first frame of a video that comprises multiple frames. The method 500 includes obtaining 520 a second frame of the video. The second frame may be temporally precedent to the first frame. The second frame may be adjacent to the first frame. The method 500 includes obtaining 530 a third frame of the video. The third frame may be temporally subsequent to the first frame. The third frame may be adjacent to the first frame. In this example, the first frame may be referred to as the central frame.

The method 500 includes denoising 540 the first frame, the second frame, and the third frame. The denoising 540 may implement a convolutional neural network-based architecture in accordance with embodiments of this disclosure and include spatial denoising of the first frame, the second frame, and the third frame. The convolutional neural network-based architecture may include a convolutional layer, an activation layer, a normalization layer, or any combination thereof. The activation layer may be a ReLU activation layer, for example, a pointwise ReLU activation layer. The normalization layer may be a batch normalization layer. The batch normalization layer may be placed between the convolutional layer and the ReLU activation layer during training. The normalization layer may be an affine layer that applies a learned normalization. The denoising 540 may be performed using a convolutional neural network that includes multiple convolutional layers. For example, the denoising 540 may be performed using a convolutional neural network that includes 10 or more convolutional layers. In one example, the denoising 540 may be performed using a convolutional neural network that includes 12 convolutional layers.

The method 500 may include performing a motion estimation, motion compensation, or both. The motion estimation or the motion compensation may include detecting an object in the second frame and the third frame relative to the first frame to determine a motion vector. The motion vector may be used to estimate motion of the object relative to the first frame. The motion estimation or the motion compensation may include applying a transformation to align 550 the denoised second frame with respect to the first frame. The motion estimation or the motion compensation may include applying a transformation to align 560 the denoised third frame with respect to the first frame. The alignment of the frames may be based on the estimated motion based on the motion vector.

The method 500 includes concatenating 570 the denoised first frame, the aligned denoised second frame, and the aligned denoised third frame into a concatenated input. The method includes denoising 580 the concatenated input. The denoising 580 may implement a convolutional network-based architecture in accordance with embodiments of this disclosure and may include temporal denoising of the concatenated input. The convolutional neural network-based architecture may include a convolutional layer, an activation layer, a normalization layer, or any combination thereof. The activation layer may be a ReLU activation layer, for example, a pointwise ReLU activation layer. The normalization layer may be a batch normalization layer. The batch normalization layer may be placed between the convolutional layer and the ReLU activation layer during training. The normalization layer may be an affine layer that applies a learned normalization. The denoising 580 may be performed using a convolutional neural network that includes multiple convolutional layers. For example, the denoising 580 may be performed using a convolutional neural network that includes 4 or more convolutional layers. In one example, the denoising 580 may be performed using 6 convolutional layers. The method includes outputting 590 a denoised frame. The denoised frame may be based on the denoised concatenated input.

A densely annotated video segmentation (DAVIS)-test testset and a Set8 testset were used to benchmark the method 500. The DAVIS-test testset contains 30 color sequences of resolution 854×480. The Set8 testset is composed of 4 color sequences from the Derfs Test Media collection and 4 color sequences captured with an image capture device. The sequences of the Set8 testset were downscaled to a resolution of 960×540. In all cases, the sequences were limited to a maximum of 85 frames. The DeepFlow algorithm was used to compute flow maps for the method 500 and video non-local Bayesian denoising (VNLB).

The method 500 output sequences featured remarkable temporal coherence. Flickering was minimal, especially in flat areas, where patch-based algorithms typically leave behind low-frequency residual noise. Table 1 shows a comparison of PSNR on the two color datasets. The values shown are the average for all sequences in the testset. The peak signal-to-noise ratio (PSNR) is computed as the average of the PSNRs of each frame.

TABLE 1

|  | Method 500 | VNLB | V-BM4D |
|---|---|---|---|
| DAVIS-test testset |  |  |  |
| $\sigma = 10$ | 38.13 | 38.85 | 37.58 |
| $\sigma = 20$ | 35.70 | 35.68 | 33.88 |
| $\sigma = 30$ | 34.08 | 33.73 | 31.65 |
| $\sigma = 40$ | 32.86 | 32.32 | 30.05 |
| $\sigma = 50$ | 31.85 | 31.13 | 28.80 |
| Set8 testset |  |  |  |
| $\sigma = 10$ | 36.08 | 37.26 | 36.05 |
| $\sigma = 20$ | 33.49 | 33.72 | 32.19 |
| $\sigma = 30$ | 31.79 | 31.74 | 30.00 |
| $\sigma = 40$ | 30.55 | 30.39 | 28.48 |
| $\sigma = 50$ | 29.56 | 29.24 | 27.33 |

As shown in Table 1, VNLB performs better for smaller values of noise. However, for larger values of noise, the method 500 surpasses VNLB. The method 500 may improve interference times. For example, the method 500 may take less than 8 seconds to denoise a 960×540 color frame, which is about 20 times faster than V-BM4D, and about 50 times faster than VNLB.

Figure 6:
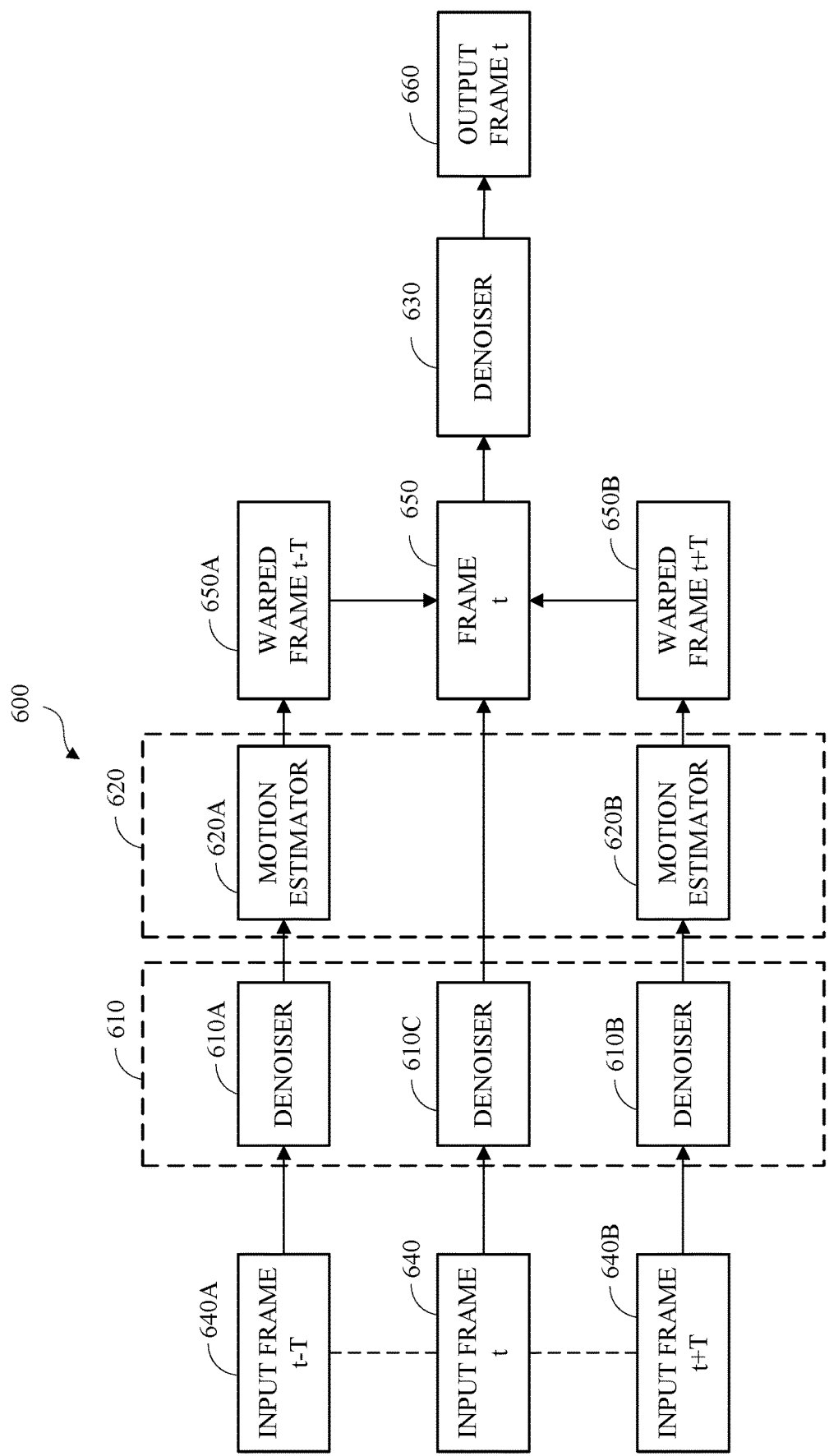
FIG. 6 is a block diagram of an example of a convolutional neural network video denoising architecture.

FIG. 6 is a block diagram of an example of a convolutional neural network video denoising architecture 600 in accordance with embodiments of this disclosure. Referring to FIG. 6, the convolutional neural network video denoising architecture 600 includes a denoiser 610, a motion estimator 620, and a denoiser 630. The denoiser 610, the denoiser 630, or both, may be trained using crops of images, or patches. The denoiser 610 and the denoiser 630 may be trained separately. In an example, the denoiser 610 may be trained first, and its outputs may be used to train the denoiser 630.

In some implementations, the denoiser 610 may include multiple denoisers, for example, denoiser 610A, denoiser 610B, and denoiser 610C. In implementations that include multiple denoisers, any number of denoisers may be used. In some implementations, the motion estimator 620 may include multiple motion estimators, for example, motion estimator 620A and motion estimator 620B. In implementations that include multiple motion estimators, any number of motion estimators may be used. In some implementations, the denoiser 610 and the motion estimator 620 may be combined into a single unit.

The denoiser 610 may include any type of denoiser. For example, the denoiser 610 may be a spatial denoiser. The denoiser 610 may include a convolutional layer, an activation layer, a normalization layer, or any combination thereof. The activation layer may be a ReLU activation layer, for example, a pointwise ReLU activation layer. The normalization layer may be a batch normalization layer. The batch normalization layer may be placed between the convolutional layer and the ReLU activation layer during training. The normalization layer may be an affine layer that applies a learned normalization.

The denoiser 610 is configured to receive an input frame 640. The denoiser 610 may also be configured to receive an input frame 640A and an input frame 640B. The input frame 640 may be referred to as the current frame. The input frame 640A is a temporally precedent frame relative to the input frame 640A and may be referred to as a past frame relative to the input frame 640. In some implementations, the input frame 640A may be adjacent to the input frame 640. In some implementations, the input frame 640A may be non-adjacent to the input frame 640. The input frame 640B is a temporally subsequent frame relative to the input frame 640 and may be referred to as a future frame relative to the input frame 640. In some implementations, the input frame 640B may be adjacent to the input frame 640. In some implementations, the input frame 640B may be non-adjacent to the input frame 640. The denoiser 610 may individually denoise the input frame 640, the input frame 640A, and the input frame 640B. The denoiser 610 may be configured to receive any number of frames, and is shown to receive three frames as an example.

The denoiser 610 is configured to denoise the input frame 640A and output the denoised frame to the motion estimator 620. The denoiser 610 is a convolutional neural network that includes multiple layers. For example, the denoiser 610 may be configured with 10 or more convolutional layers. In one example, the denoiser 610 may be configured with 12 convolutional layers.

The motion estimator 620 is configured to receive the denoised frame from the denoiser 610. The motion estimator 620 is configured to detect an object in the input frame 640A relative to the input frame 640 to determine a motion vector. The motion vector may be used to estimate motion of the object relative to the input frame 640. The motion estimator 620 may be configured to apply a transformation to align the denoised frame with respect to the input frame 640. The motion estimator 620 may output the aligned denoised frame as a warped frame 650A.

The denoiser 610 is configured to denoise the input frame 640B and output the denoised frame to the motion estimator 620. The motion estimator 620 is configured to receive the denoised frame from the denoiser 610. The motion estimator 620 is configured to detect one or more objects in the input frame 640B relative to the input frame 640 to determine a motion vector for each of the one or more objects. The motion vector may be used to estimate motion of each pixel relative to the denoised input frame 640. For example, the motion vector may be two maps of the same size of the input images that express the movement in the x and y axis of each pixel in the image. The motion estimator 620 may be configured to apply a transformation to align the denoised frame with respect to the input frame 640. The alignment of the frames may be based on the estimated motion based on one or more motion vectors. The motion estimator 620 may output the aligned denoised frame as a warped frame 650B.

The denoiser 610 is configured to denoise the input frame 640 and output the denoised frame 650. The convolutional neural network video denoising architecture 600 is configured to concatenate the denoised frame 650, the warped frame 650A, and the warped frame 650B and input the concatenated frame to the denoiser 630.

The denoiser 630 may include any type of denoiser. For example, the denoiser 630 may be a temporal denoiser. The denoiser 630 may include a convolutional layer, an activation layer, a normalization layer, or any combination thereof. The activation layer may be a ReLU activation layer, for example, a pointwise ReLU activation layer. The normalization layer may be a batch normalization layer. The batch normalization layer may be placed between the convolutional layer and the ReLU activation layer during training. The normalization layer may be an affine layer that applies a learned normalization.

The denoiser 630 is configured to receive the concatenated frame. The denoiser 630 is configured to denoise the concatenated frame and output a denoised output frame 660. The denoiser 630 is a convolutional neural network that includes multiple layers. For example, the denoiser 630 may be configured with 4 or more convolutional layers. In one example, the denoiser 630 may be configured with 6 convolutional layers.

Figure 7:
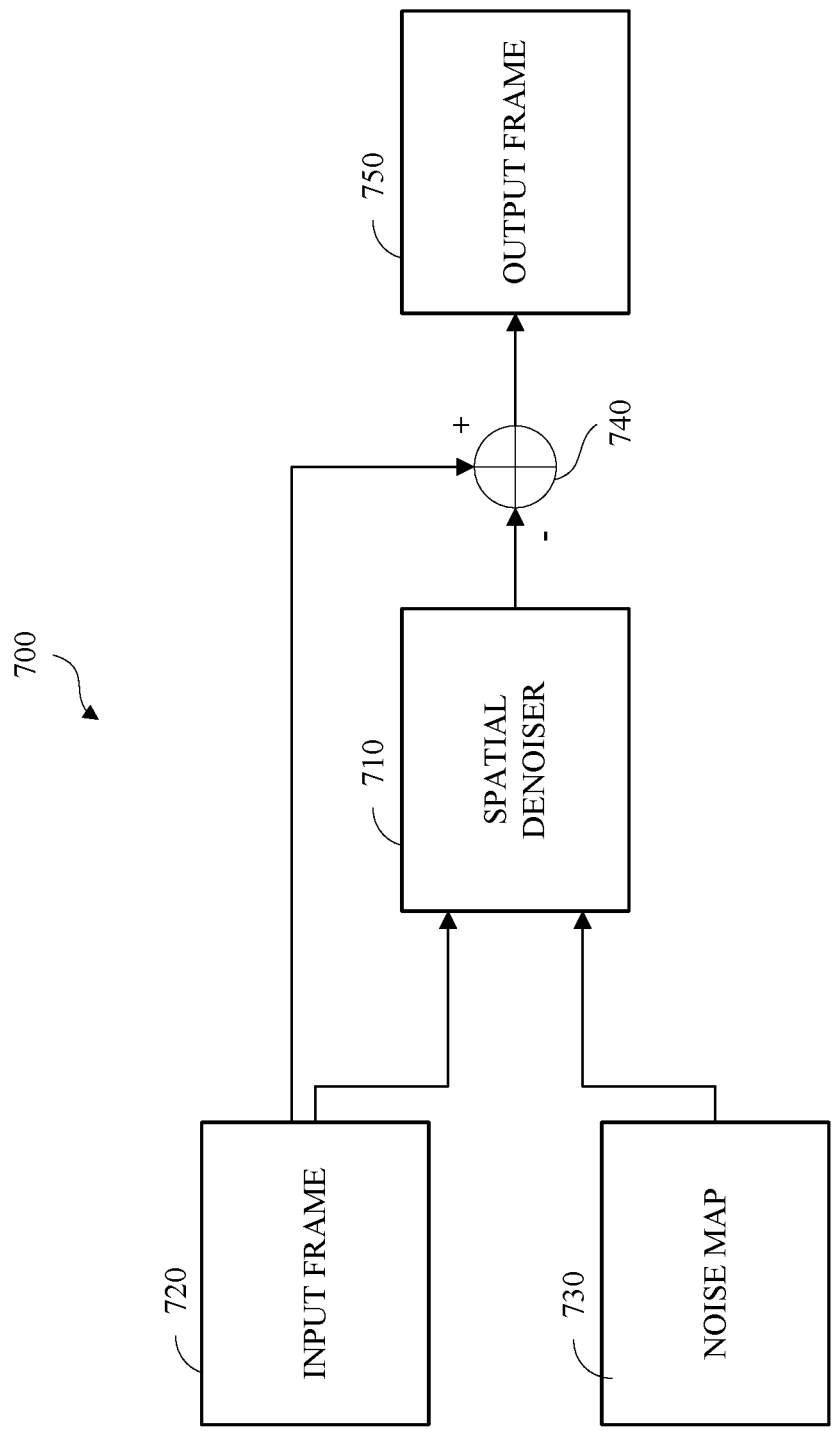
FIG. 7 is a block diagram of an example of a spatial denoising architecture.

FIG. 7 is a block diagram of an example of a spatial denoising architecture 700 in accordance with embodiments of this disclosure. The spatial denoising architecture 700 may be implemented in the denoiser 610 shown in FIG. 6. Referring to FIG. 7, the spatial denoising architecture 700 includes a spatial denoiser 710. The spatial denoiser 710 may include one or more convolutional layers, one or more activation layers, one or more normalization layers, or any combination thereof. The activation layer may be a ReLU activation layer, for example, a pointwise ReLU activation layer. The normalization layer may be a batch normalization layer.

In an example, the spatial denoiser 710 may include $D_{spa}=12$ convolutional layers. A number of feature maps may be set to W=96. The outputs of the convolutional layers may be followed by pointwise ReLU activation functions $ReLU(\cdot)=\max(\cdot,0)$. The batch normalization layer may be placed between the convolutional layer and the ReLU activation layer during training. At evaluation time, the batch normalization layer may be removed and replaced with an affine layer that applies a learned normalization. The spatial size of the convolutional kernels may be 3×3, and the stride may be set to 1.

The spatial denoiser 710 is configured to receive an input frame 720 and a noise map 730. The noise map 730 may be based on the input frame 720, and may be applied on a frame-by-frame basis. The spatial denoiser 710 may downscale the input frame 720. For example, the spatial denoiser 710 may downscale the input frame 720 to a quarter resolution. Performing the denoising at a lower resolution may result in a large reduction in run time, memory requirements, or both, without sacrificing denoising performance. The spatial denoiser 710 is configured to denoise the input frame 720 by applying the noise map 730 to process spatially varying noise. In contrast to typical denoisers, the spatial denoiser 710 may not require any parameters as inputs other than the image sequence and the estimation of the input noise.

The spatial denoiser 710 is configured to output a denoised frame to a residual connection 740. The residual connection 740 is configured to receive the denoised frame from the spatial denoiser 710 and the unprocessed input frame 720. The residual connection 740 may combine the denoised frame and the input frame 720 to obtain the output frame 750. In some embodiments, the residual connection 740 may be configured to subtract the denoised frame from the input frame 720 to obtain the output frame 750. In an example, the residual connection 740 may be configured to upscale the result of the combined denoised frame and the input frame 720.

The spatial denoiser 710 may be trained using crops of images, or patches. The size of the patches may be larger than the receptive field of the networks. The training dataset for the spatial denoiser 710 may be composed of pairs of input-output patches $$\{((\tilde{I}^j, M^j), I^j)\}_{j=0}^{m_s}$$

which are generated by adding AWGN with standard deviation $\sigma \in [0, 55]$ to clean patches $I^j$ and building the corresponding noise map $M^j$, which, in this example, may be constant with all its elements equal to $\sigma$. A total of $m_s=1024000$ patches may be extracted from a database, for example, the Waterloo Exploration Database. The patch size may be, for example, 50×50. The spatial denoiser 710 may be configured to randomly sample images of the training dataset, and to randomly crop the sampled images to obtain the patches.

The spatial denoiser 710 may be configured to perform residual learning. For example, if the network outputs an estimation of the input noise $\mathcal{F}_{spa}(\tilde{I};\theta_{spa})=\hat{N}$, then the denoised image is computed by subtracting the output noise from the noisy input.

$$\hat{I}(\tilde{I};\theta_{spa})=\tilde{I}-\mathcal{F}_{spa}(\tilde{I};\theta_{spa}). \quad (2)$$

The loss function of the spatial denoiser may write:

$$\mathcal{L}_{spa}(\theta_{spa}) = \frac{1}{2m_s}\sum_{j=1}^{m_s}\|\hat{I}^j(\tilde{I}^j;\theta_{spa}) - I^j\|^2, \quad (3)$$

where $\theta_{spa}$ is the collection of all learnable parameters.

The spatial denoiser 710 may be configured to apply an adaptive moment estimation (ADAM) algorithm to minimize the loss function. The ADAM algorithm may be applied with all of its hyper-parameters set to their default values. The number of epochs may be set to 80, and the mini-batch size may be 128. The scheduling of the learning rate may start at 1e-3 for the first 50 epochs. The scheduling may change to 1e-4 for the following 10 epochs, and then switch to 1e-6 for the remaining training. The data may be augmented by introducing rescaling by different scale factors and random flips. By augmenting the training data in this way, five training samples may be created from one training sample. During the first 60 epochs, the orthogonalization of the convolutional kernels may be applied as a regularization. Initializing the training with orthogonalization may be beneficial to performance.

Figure 8:
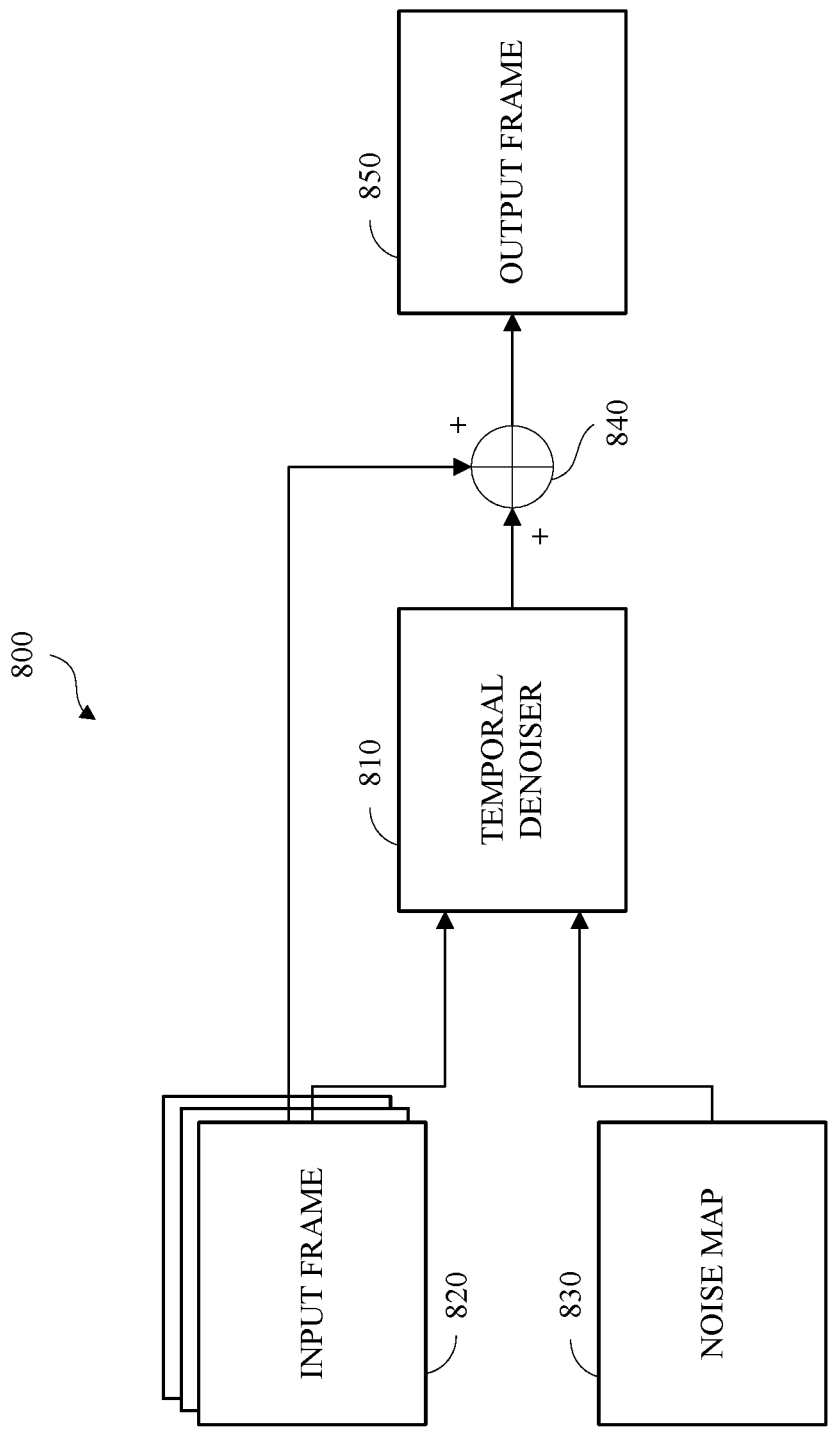
FIG. 8 is a block diagram of an example of a temporal denoising architecture.

FIG. 8 is a block diagram of an example of a temporal denoising architecture 800 in accordance with embodiments of this disclosure. The temporal denoising architecture 800 may be implemented in the denoiser 630 shown in FIG. 6. Referring to FIG. 8, the temporal denoising architecture 800 includes a temporal denoiser 810. The temporal denoiser 810 may include one or more convolutional layers, one or more activation layers, one or more normalization layers, or any combination thereof. The activation layer may be a ReLU activation layer, for example, a pointwise ReLU activation layer. The normalization layer may be a batch normalization layer.

In an example, the temporal denoiser 810 may include $D_{temp}=6$ convolutional layers. A number of feature maps may be set to W=96. The outputs of the convolutional layers may be followed by pointwise ReLU activation functions ReLU($\cdot$)=max($\cdot$,0). The batch normalization layer may be placed between the convolutional layer and the ReLU activation layer during training. At evaluation time, the batch normalization layers may be removed and replaced with an affine layer that applies a learned normalization. The spatial size of the convolutional kernels may be 3×3, and the stride may be set to 1.

The temporal denoiser 810 is configured to receive a concatenated input frame 820 and a noise map 830. The concatenated input frame 820 may be, for example, a frame that comprises the denoised frame 650, the warped frame 650A, and the warped frame 650B of FIG. 6. The noise map 830 may be based on the concatenated input frame 820, and may be applied on a frame-by-frame basis. The temporal denoiser 810 may downscale the concatenated input frame 820. For example, the temporal denoiser 810 may downscale the concatenated input frame 820 to a quarter resolution. Performing the denoising at a lower resolution may result in a large reduction in run time, memory requirements, or both, without sacrificing denoising performance. The temporal denoiser 810 is configured to denoise the concatenated input frame 820 by applying the noise map 830 to process spatially varying noise. In contrast to typical denoisers, the temporal denoiser 810 may not require any parameters as inputs other than the image sequence and the estimation of the input noise.

The temporal denoiser 810 may be configured to denoise the concatenated input frame 820 in multiple iterations. The temporal denoiser 810 is configured to output a denoised frame to a residual connection 840. The residual connection 840 is configured to receive the denoised frame from the temporal denoiser 810 and the unprocessed concatenated input frame 820. The residual connection 840 may combine the denoised frame and the concatenated input frame 820 to obtain the output frame 850. In an example, the residual connection 840 may be configured to upscale the result of the combined denoised frame and the concatenated input frame 820.

The temporal denoiser 810 may be trained using crops of images, or patches. The size of the patches may be larger than the receptive field of the networks. The training dataset for the temporal denoiser 810 may be composed of input-output pairs $$P_t^j = \{(({}^w\hat{I}_{t-T}^j, \ldots, \hat{I}_t^j, \ldots, {}^w\hat{I}_{t+T}^j), M^j), I_t^j)\}_{j=0}^{m_t}, \quad (4)$$

where $({}^w\hat{I}_{t-T}^j, \ldots, {}^w\hat{I}_{t+T}^j)$ is a collection of 2T+1 spatial patches cropped at the same location in contiguous frames. The temporal denoiser 810 may generate the input-output pairs by adding AWGN of σ∈[0, 55] to clean patches of a sequence, and denoising them using a spatial denoiser. The temporal denoiser 810 may be configured to perform motion compensation on the 2T patches contiguous to the central reference patch $I_t^j$ with respect to the latter, that is, ${}^w\hat{I}_t^j$=compensate($\hat{I}_t^j,\hat{I}_t^j$). To compensate frames, the temporal denoiser 810 may use an algorithm, such as a DeepFlow algorithm, for the estimation of the optical flow between frames. The noise map $M^j$ may be the same one used in the spatial denoising stage.

In an example, the temporal denoiser 810 may extract a total of $m_t$=450000 training samples from the training set from a database. The database in this example may be a densely annotated video segmentation (DAVIS) database. The spatial size of the patches may be 44×44, while the temporal size may be 2T+1=5. The loss function for the temporal denoiser 810 may be $$\mathcal{L}_{temp}(\theta_{temp}) = \frac{1}{2m_t}\sum_{j=1}^{m_t}\|\hat{I}_{temp,t}^j - I_t^j\|^2, \quad (5)$$

where $\hat{I}_{temp,t}^j = \mathcal{F}_{temp}(P_t^j; \theta_{temp})$.

The temporal denoiser 810 may be configured to apply an ADAM algorithm to minimize the loss function. The ADAM algorithm may be applied with all of its hyper-parameters set to their default values. The number of epochs may be set to 80, and the mini-batch size may be 128. The scheduling of the learning rate may start at 1e−3 for the first 50 epochs. The scheduling may change to 1e−4 for the following 10 epochs, and then switch to 1e−6 for the remaining training. The data may be augmented by introducing rescaling by different scale factors and random flips. By augmenting the training data in this way, five training samples may be created from one training sample. During the first 60 epochs, the orthogonalization of the convolutional kernels may be applied as a regularization. Initializing the training with orthogonalization may be beneficial to performance.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for denoising a video comprising multiple frames, the method comprising:
   obtaining a first frame of the video;
   obtaining a second frame of the video, wherein the second frame is a temporally precedent frame relative to the first frame;
   obtaining a third frame of the video, wherein the third frame is a temporally subsequent frame relative to the first frame;
   performing, using a first denoiser, a first denoising of the first frame, the second frame, and the third frame, wherein the first denoiser is trained by randomly sampling images of a training dataset, randomly cropping the sampled images to obtain patches, and adding additive white Gaussian noise (AWGN) to the patches;
   aligning the denoised second frame with respect to the first frame;
   aligning the denoised third frame with respect to the first frame;
   concatenating the denoised first frame, the aligned denoised second frame, and the aligned denoised third frame into a concatenated frame;
   performing, using a second denoiser, a second denoising of the concatenated frame, wherein the second denoiser is trained using spatial patches cropped at a same location in contiguous frames; and
   outputting a denoised frame based on the denoised concatenated frame.

2. The method of claim 1, wherein the temporally precedent frame is adjacent to the first frame.

3. The method of claim 1, wherein the temporally subsequent frame is adjacent to the first frame.

4. The method of claim 1, wherein the first denoising is a spatial denoising.

5. The method of claim 4, wherein the spatial denoising includes applying a convolutional layer, an activation layer, and a normalization layer.

6. The method of claim 5, wherein the activation layer is a pointwise rectified linear unit (ReLU) activation layer.

7. The method of claim 6, wherein the normalization layer is a batch normalization layer that is placed between the convolutional layer and the pointwise ReLU activation layer during training.

8. The method of claim 6, wherein the normalization layer is an affine layer that applies a learned normalization.

9. The method of claim 5, wherein the convolutional layer, the activation layer, and the normalization layer are applied 10 or more times.

10. The method of claim 1, wherein the second denoising is a temporal denoising.

11. The method of claim 10, wherein the temporal denoising includes applying a convolutional layer, an activation layer, and a normalization layer.

12. The method of claim 11, wherein the convolutional layer, the activation layer, and the normalization layer are applied 4 or more times.

13. An image capture device comprising:
   an image sensor configured to capture a first frame, a second frame, and a third frame;
   a spatial denoiser configured to individually denoise the first frame, the second frame, and the third frame, wherein the spatial denoiser is trained by randomly sampling images of a training dataset, randomly cropping the sampled images to obtain patches, and adding additive white Gaussian noise (AWGN) to the patches;
   a motion estimator configured to:
      detect an object in each of the first frame, the second frame, and the third frame;
      estimate a motion of the object; and
      apply a transformation to each of the first frame, the second frame, and the third frame, wherein the transformation is based on the estimated motion;
   a processor configured to concatenate the first frame, the second frame, and the third frame to obtain a concatenated frame; and a temporal denoiser configured to denoise the concatenated frame and output a denoised frame, wherein the temporal denoiser is trained using spatial patches cropped at a same location in contiguous frames.

14. The image capture device of claim 13, wherein the spatial denoiser is further configured to apply an adaptive moment estimation (ADAM) algorithm to minimize a loss function.

15. The image capture device of claim 13, wherein the temporal denoiser is further configured to denoise the output of the motion estimator based on the noise map.

16. The image capture device of claim 13, wherein the temporal denoiser is configured to estimate an optical flow between the first frame, the second frame, and the third frame.

17. The image capture device of claim 13, wherein the spatial denoiser comprises a convolutional layer, an activation layer, and a normalization layer.

18. The image capture device of claim 13, wherein the temporal denoiser comprises a convolutional layer, an activation layer, and a normalization layer.

19. An image capture device comprising:

an image sensor configured to capture a first frame and an adjacent frame;

a spatial denoiser configured to denoise the first frame and the adjacent frame, wherein the spatial denoiser is trained by randomly sampling images of a training data set, randomly cropping the sampled images to obtain patches, and adding additive white Gaussian noise (AWGN) to the patches;

a processor configured to concatenate the first frame and the adjacent frame to obtain a concatenated frame; and a temporal denoiser configured to denoise the concatenated frame and output a denoised frame, wherein the temporal denoiser is trained using spatial patches cropped at a same location in contiguous frames.

20. The image capture device of claim 19, wherein the temporal denoiser is trained using an output of the spatial denoiser training.

* * * * *